US007528190B2

(12) United States Patent
Wayton et al.

(10) Patent No.: US 7,528,190 B2
(45) Date of Patent: May 5, 2009

(54) LOW BAKE, LOW VOC CONDUCTIVE PRIMER

(75) Inventors: Brian J. Wayton, Medina, OH (US); Hong Ding, Hudson, OH (US); Michael W. Cox, Mayfield Village, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 380 days.

(21) Appl. No.: 11/240,697

(22) Filed: Sep. 30, 2005

(65) Prior Publication Data
US 2006/0163541 A1    Jul. 27, 2006

Related U.S. Application Data

(60) Provisional application No. 60/614,620, filed on Sep. 30, 2004.

(51) Int. Cl.
C08L 31/00    (2006.01)
C08B 67/00    (2006.01)
H01B 1/12     (2006.01)
B05D 1/02     (2006.01)

(52) U.S. Cl. .................... 524/556; 524/502; 427/421.1; 427/393; 252/500; 523/526

(58) Field of Classification Search ............... 524/502, 524/556; 427/421.1, 393.5; 523/526; 252/500
See application file for complete search history.

(56) References Cited

U.S. PATENT DOCUMENTS

| 4,735,995 | A | 4/1988 | Chettiath |
| 4,883,834 | A | 11/1989 | Yamamoto et al. |
| 4,981,729 | A | 1/1991 | Zaleski |
| 4,981,730 | A | 1/1991 | Zaleski |
| RE34,066 | E | 9/1992 | Yamamoto et al. |
| 5,194,328 | A | 3/1993 | Suzuki et al. |
| 5,262,207 | A | 11/1993 | Garner et al. |
| 5,358,779 | A | 10/1994 | McGarry |
| 5,502,149 | A | 3/1996 | Yoshida et al. |
| 5,674,565 | A | 10/1997 | Kausch et al. |
| 5,767,188 | A | 6/1998 | Kamikuri et al. |
| 5,844,037 | A | 12/1998 | Lundgard et al. |
| 5,993,906 | A | 11/1999 | Smith et al. |
| 6,080,296 | A | 6/2000 | Lieverz et al. |
| 6,180,181 | B1 | 1/2001 | Verardi et al. |
| 6,235,228 | B1 * | 5/2001 | Nicholl et al. ............... 264/255 |
| 6,541,076 | B2 | 4/2003 | Dunkle |
| 6,558,746 | B2 | 5/2003 | Starz et al. |
| 2003/0134929 | A1 | 7/2003 | Blum et al. |
| 2004/0077778 | A1 | 4/2004 | Hazan et al. |
| 2004/0138389 | A1 | 7/2004 | Baumgart et al. |
| 2004/0149960 | A1 | 8/2004 | Tremper, III et al. |

FOREIGN PATENT DOCUMENTS

| EP | 554780 | 8/1993 |
| EP | 636669 A2 * | 2/1995 |
| EP | 645411 | 3/1995 |
| EP | 661317 | 7/1995 |
| JP | 55060513 | 5/1980 |
| JP | 01287178 | 11/1989 |
| WO | 0104222 | 1/2001 |

OTHER PUBLICATIONS

Polyurethanes Chemistry, Technology and Applications, Professor Z. Wirpsza, Polytechnical University, Radom, Poland, "Isocyanates", pp. 11-29, 1993.
Polyurethanes Chemistry, Technology and Applications, Professor Z. Wirpsza, Polytechnical University, Radom, Poland, "Catalysts", pp. 53-61, 1993.
Surface Coatings—Raw Materials and Their Usage-vol. 1, 1993, "Solvent-Borne Urethane Resins", pp. 165-167.
50 Years of Amino Coating Resins, Kirsch, 1986, pp. 19-65.
Speciality Products for Coatings & Inks, King Industries, pp. 4-7.
Handbook of Coatings Additives, vol. 2, Calbo, 1992, "Polymeric Dispersants", pp. 93-103.
Paint Flow and Pigment Dispersion, A Rheological Approach to Coating and Ink Technology, Second Edition, Patton, "Interface Activity, Surfactants and Dispersions", pp. 280-300, 1979.
Solvent Selector Chart, Eastman.
Surface Coatings—Raw Materials and Their Usage-vol. 1, 1993, "Solvents", Reed, pp. 356-367.
Modern Plastics—World Encyclopedia, 2000, "A Plastics Primer", Carley, Nov. 1999, pp. 11-13.
Air Spray Manual, Binks Manufacturing Company, 1976, pp. 1-13.
Spray Paint Defects-Seminar, Schneberger.
Lactec, Specialists for Painting Technology, Disc-Atomizer, Nov. 1999, pp. 1-5.
Database WP1, XP-002374034, Derwent Publications Ltd., London, GB, Nov. 17, 1989, abstract (corresponds to JP 01287178).
Database EPODOC, XP-002374020, The Hague, NL, May 7, 1980, abstract (corresponds to JP 55060513).

* cited by examiner

Primary Examiner—Randy Gulakowski
Assistant Examiner—Michael M Bernshteyn
(74) Attorney, Agent, or Firm—Arthi K. Tirey; Robert E. McDonald; Eryn Ace Fuhrer

(57) ABSTRACT

The present invention provides for a sealer/primer that is generally cured at low bake temperatures. The composition utilizes a resin system to provide both conductivity and adhesion of the coating onto plastic substrates. The present invention uses a polyester, such as one that includes unsaturated polyester, in combination with other resins, including an acrylic, crosslinking agent and conductive pigment to create a conductive primer that can be cured at low temperatures. The composition can be applied through traditional application equipment, seals the surface of the substrate to which it is applied, and cures to an acceptable surface for further processing, such as painting.

19 Claims, No Drawings

LOW BAKE, LOW VOC CONDUCTIVE PRIMER

CROSS-REFERENCE TO RELATED APPLICATIONS

This application claims the benefit of U.S. Provisional Application No. 60/614,620, filed Sep. 30, 2004, the entirety of which is hereby incorporated by reference.

DETAILED DESCRIPTION OF THE INVENTION

The present invention concerns coating compositions, particularly conductive primer compositions. The coating composition of the present invention is more particularly a low bake, low VOC conductive primer.

Generally, the primer composition of the subject invention utilizes a resin system to provide both conductivity and adhesion of the coating onto plastic substrates. Though various coating systems exist for application onto plastic substrates, the present invention provides for the novel use of an unsaturated polyester, in combination with an acrylic, crosslinking agents, and conductive pigments. The resulting composition is a conductive primer that can be cured at low temperatures.

The primer as disclosed herein may be used with either low bake or high bake topcoats. As is detailed hereinafter, the present invention is generally a conductive coating composition that not only functions as a primer but may also be utilized as a sealer or a combination, as well. This new primer provides good adhesion to plastic substrates, good conductivity to allow electrostatic application of subsequent paint layers, and improved pop resistance due to outgassing.

In accordance herewith there is provided a coating composition. The composition is a low VOC, low bake curable primer that is conductive. The coating composition hereof, generally, comprises a mixture of: (a) a resin composition, and (b) a conductive pigment or a mixture of pigments. Generally, the resin composition includes a resin system and a crosslinking agent. The resin system includes at least one polyester, but may include a combination of polyesters, and may optionally also include an acrylic or combination of acrylics. Generally, the coating composition may include a polyester and acrylic cross-linked with an isocyanate. As used herein, the term "polyester" shall mean a polyester polymer and the term "acrylic" shall mean an acrylic polymer.

Unless otherwise indicated, as used herein, the terms "about" and "approximately" mean±20%.

One embodiment of the composition disclosed herein comprises a resin system that includes (i) from about 10% to about 100% of a polyester, based on the total weight of the resin system, and (ii) from about 0% to about 90% of acrylic, based upon the total weight of the resin system. Furthermore, the resin composition includes a crosslinking agent, such as isocyanate, based upon a 0.75 to about 1.5 NCO:OH molar ratio. The composition of this embodiment may also include from about 2% to about 15%, based on the weight of the total resin solids, of a conductive pigment. As used herein, "total resin solids" means the total solid weight of the resin compositions.

The pigment mixture may comprise both conductive and non-conductive pigments in admixture including (a) a mixture of conductive pigments and (b) a mixture of conductive and non-conductive pigment. In one embodiment, a conductive carbon black pigment may be used.

The resin composition of the present invention generally includes at least one polyester, at least one acrylic, and at least one crosslinking agent. However, alternative embodiments of the resin composition may be utilized. For example, it is not always necessary to utilize an acrylic, but instead it may be desirable to have a resin composition that includes at least one polyester and at least one isocyanate. Another example of an alternative embodiment consists of using an amino resin as a crosslinking agent, instead of or in combination with an isocyanate as the crosslinker. Other crosslinking materials can also be employed.

One polyester that is suitable for use in accordance with an embodiment of the subject invention includes an unsaturated polyester. Unsaturated polyesters are, for instance, polyesters as they are obtained by esterifying at least one ethylenically unsaturated di- or higher polycarboxylic acid, or anhydride, such as maleic anhydride, fumaric acid, glutaconic acid, itaconic acid, mesaconic acid, citraconic acid, allylmalonic acid, tetrahydrophthalic acid, and others, with saturated and unsaturated di- or higher polyols, such as ethylene glycol, propylene glycol, diethylene glycol, dipropylene glycol, polyethylene glycol, 1,4-butylene glycol, triethylene glycol, 1,2- and 1,3-propanediols, 1,2-, 1,3- and 1,4-butanediols, 2,2-dimethyl-1,3-propanediol, 2-hydroxymethyl-2-methyl-1,3-propanediol, 2-buten-1,4-diol, 2-butyn-1,4-diol, 2,4,4-trimethyl-1,3-pentanediol, glycerol, pentaerythritol, mannitol and others. Mixtures of such di- or higher polyacids and/or mixtures of such di- or higher polyols may also be used. The ethylenically unsaturated di- or higher polycarboxylic acids may be partially replaced by saturated di- or polycarboxylic acids, such as adipic acid, succinic acid, sebacic acid and other, and/or by aromatic di- or higher polycarboxylic acids, such as phthalic acid, trimellitic acid, pyromellitic acid, isophthalic acid and terephthalic acid. It is to be appreciated that saturated polyesters, or a combination of unsaturated polyesters and saturated polyesters may also be used in accordance with this invention.

When using an unsaturated polyester in the resin composition, it is desirable to maintain unsaturation of the polyester in the coating, which promotes conductivity and adhesion to plastic substrates. Conventional uses of unsaturated polyesters in coating composition promote the curing of the unsaturation of the polyester with monomers such as styrene and vinyl esters. However, the present invention maintains the unsaturation of the polyester on the backbone and does not promote free-radical reaction of the double bonds. The unsaturated polyester does not undergo further crosslinking in the coating through its double bonds, but rather the polyester undergoes crosslinking through hydroxyl functionality.

To maintain good conductivity and adhesion, the polyester contains about 5% to about 60% of unsaturated dibasic acids or anhydrides. In an alternative embodiment, the polyester contains about 10% to about 40% of unsaturated dibasic acids or anhydrides. In one useful embodiment, the polyester contains about 25% maleic anhydride.

In one embodiment, the polyester is prepared from a group of monomers such as trimethylolpropane (TMP), 2-methyl-1,3-propanediol (MPdiol), adipic acid, phthalic anhydride, propylene glycol, cyclohexane diacid, and maleic anhydride. In one useful embodiment, the polyester includes a combination of TMP, propylene glycol, cyclohexane diacid, and maleic anhydride.

In one embodiment, the polyester contains both primary and secondary hydroxyl groups. In this embodiment, the propylene glycol provides the secondary hydroxyl and the MPdiol provides the primary hydroxyl functionality. In another embodiment, a polyester containing secondary hydroxyl groups is used. It is particularly useful to employ a polyester containing secondary hydroxyl functionality. The polyester has an average hydroxyl functionality of about 1 to about 20 free hydroxyl groups per molecule.

In one embodiment, the polyester may have a hydroxyl number from about 50 to about 400 mg KOH/g. However, the polyester may have a hydroxyl number from about 100 to about 300 mg KOH/g. In one useful embodiment, the polyester has a hydroxyl number of about 250 mg KOH/g.

The unsaturated polyester has a weight average molecular weight of about 400 to about 4000. In one useful embodiment, the weight average molecular weight of the unsaturated polyester is from about 700 to about 1300. In yet another useful embodiment, the weight average molecular weight of the unsaturated polyester is about 900.

The glass transition temperature (Tg) of the polyester can generally range between −40° C. to about 20° C. In one useful embodiment, the Tg is −15° C.

In one embodiment, the resin composition includes from about 10% to about 100% unsaturated polyester, based on the total weight of the resin system. In another useful embodiment, the resin composition includes from about 10% to about 90% unsaturated polyester, based on the total weight of the resin system. In another useful embodiment, the resin composition includes from about 30% to about 70% unsaturated polyester, based on the total weight of the resin system. In yet another useful embodiment, the resin composition includes about 45% unsaturated polyester, based on the total weight of the resin system.

The use of polyester as described herein, particularly the use of an unsaturated polyester is believe to provide the primer with higher conductivity with reduced viscosity, thereby resulting in a low VOC composition. An unsaturated polyester is believed to provide the primer with good conductivity at low bake temperatures or air dry conditions.

Acrylics that may be use in accordance with the subject invention include any conventionally known acrylic polymer obtained by the polymerization of ethylenically unsaturated monomers, such as styrene, alpha-methylstyrene, p-methylstyrene, vinyl acetates, vinyl ethers, vinyl esters, and (meth) acrylates of monohydric alcohols, acrylamides and similar (meth)acrylate acid derivatives, such as methylmethacrylate, hydroxyethyl acrylate, ethyl acrylate, acrylonitrile, and acrylamide, n-butyl acrylate, n-butyl methacrylate, and others, or mixtures thereof.

In one embodiment, the acrylic has a hydroxyl number from about 20 to about 200 mg KOH/g. However, the acrylic may have a hydroxyl number from about 50 to about 100 mg KOH/g. In one useful embodiment, the acrylic has a hydroxyl number of about 84 mg KOH/g.

The acrylic generally has a weight average molecular weight of about 1600 to about 7000. In one useful embodiment, the weight average molecular weight of the acrylic is from about 2000 to about 5000. In yet another useful embodiment, the weight average molecular weight of the acrylic is about 3300.

The glass transition temperature (Tg) of the acrylic can generally range between −10° C. to about 80° C. In one embodiment, the Tg is 35° C.

As noted hereinabove, generally, the resin composition includes acrylic in an amount ranging from about 0% to about 90%, by weight, based on the total weight of the resin system. In another useful embodiment the acrylic is present in an amount from about 30% to about 70%, by weight, based upon the total weight of the resin system. In yet another useful embodiment, acrylic is present in an amount of about 55% by weight, based on the total weight of the resin system.

An unsaturated polyester in combination with an acrylic is believed to provide additional benefits such as improved film hardness and adhesion properties while maintaining good conductive shelf stability, conductive pot life, and a wide conductive application window.

A suitable crosslinking material that may be utilized in the resin composition is an isocyanate that is selected from isocyanate-functional materials that are well known in the art and include mono-, di-, tri- and multi-functional isocyanates as well as polyisocyanates that utilize di-, tri-, and multi-functional isocyanate material.

Suitable isocyanate functional materials include but are not limited to aromatic, cycloaliphatic and aliphatic isocyanates such as cyclohexyl isocyanate, phenyl isocyanate, toluene isocyanate, 1,3 and 1,4 phenylene diisocyanate, 4-chloro-1,3-phenylene diisocyanate, toluene-2,4- or 2,6-diisocyanate, 1,2,4-benzene triisocyanate, 1,5- and 1,4-naphthalene diisocyanate, 2,4' and 4,4' diphenylmethane diisocyanate, 3,3'-dimethyl-4,4'-diphenylene diisocyanate, triphenylmethane triisocyanate, polymethylene polyphenyl isocyanate, 1,6 hexamethylene diisocyanate, isophorone diisocyanate, 4,4-dicyclohexylmethane diisocyanate, 2,2,4(2,4,4)-trimethyl-1,6-hexamethylene diisocyanate, trimethylhexamethylene diisocyanate, 1,4-diisocyanato pentane, isocyanatomethylcyclohexyl isocyanate, 1,6,11-undecane triisocynate, p- and m-tetramethylxylene diisocynate, 1,4-tetramethylene diisocyanate, 1,10-decamethylene diisocyanate, m-xylene diisocyanate, 1,3-bis(isocyanatemethyl)cyclohexane, and mixtures thereof.

It has been found that aliphatic polyisocyanates are particularly useful in accordance with this invention. Blocked isocyanates may be employed as well. However, any known isocyanate may be used. The NCO group of the isocyanate reacts with the hydroxyl groups of the polyester and acrylic resins to form crosslinking.

Generally, the resin composition includes a crosslinking agent in an amount sufficient to crosslink with the hydroxyl groups on the polyester and/or acrylic. Generally, the isocyanate is present in ratio of about 0.75 to about 1.5 based on the NCO:OH ratio. In one useful embodiment, the isocyanate is present in a ratio of about 0.8 to about 1.2 based on the NCO:OH ratio.

In one embodiment, a catalyst may be used in the coating composition. A catalyst aids in completing or expediting the reaction. Catalysts that may be used in accordance with this invention for the isocyanate-hyroxyl reaction include non-metal catalysts, such as amine catalysts like tertiary amines, including but not limited to triethyl diamine, 1-dimethylamino ethyl-4-methyl piperazine, 1,1,3,5,5-pentamethyl-diethylene triamine, N,N-dimethyl cyclohexylamine, N,N-diethyl piperazine, bis(2-dimethylaminoethyl)ether. Other catalysts that may be used are metal catalysts, including but not limited to dibutyl tin diluarate, dibutyl tin diacetate, dibutyl tin dioctoate, stannous octoate, zinc octoate, potassium octoate, and zirconium octoate.

In one embodiment, the coating composition includes from about 0% to about 1% catalyst, such as the urethane catalysts described above, by weight based on the total resin solids. In another useful embodiment, the coating composition includes from about 0.10% to about 0.60% catalyst by weight based on the weight of the total resin solids. In yet another useful embodiment, the coating composition includes about 0.19% catalyst by weight based on the total resin solids.

As previously mentioned, it may also be useful to employ the use of an amino crosslinker as part of the resin composition. Amino resins include urea formaldehyde, melamine formaldehyde, benzoguanamine formaldehyde, glycoluril formaldehyde resins and mixtures there of. These amino resins may contain varying levels of methylation, alkylation, degree of polymerization, and functionality. The alkoxy groups may include but is not limited to methoxy, ethoxy, n-butoxy, or iso-butoxy groups or combinations thereof. The amino resin may also include carboxylic acid and other forms of modification. The amino resins react with hydroxyl groups and homopolymerize to form crosslinking. The amino resin may be 5-50% by weight based on the total resin solids.

Suitable catalysts for use with amino resins include but are not limited to blocked and unblocked p-toluene sulfonic acid, dodecylbenzene sulfonic acid, dinonylnaphthalene sulfonic acid, dinonylnaphthalene disulfonic acid, alkyl acid phosphate, phenyl acid phosphate, phosphoric acid, carboxylic acids, and metal salts such as magnesium bromide, aluminum nitrate, and zinc nitrate. Catalyst level can range from 0.2-7% by weight based on the total resin solids.

In one embodiment, the coating composition also includes a conductive pigment. Usually conductive pigments of the type contemplated for use herein, ordinarily, include conductive carbon black pigment. These conductive pigments are well-known and commercially available compounds and are, generally, defined as dry conductive carbon black pigment. However, any conductive pigment may be used to provide for a conductive primer. Dispersions can be made of any of a number of pigments in monomers or oligomers or polymers, or combinations thereof. In one useful embodiment, a mixture of conductive pigments is employed.

Other components that can be added to the present coating system to induce or enhance conductivity include, additional conductive pigments other than those enumerated above and include graphite, antimony doped tin oxide pigments, and metallic pigments such as gold, platinum, silver, titanium, aluminum, copper, graphite and the like, as well as mixtures thereof. Conductive pigments come in forms such as flakes, powders, spheres, microballoons, microencapsulated, or other physical forms. Other conductive materials that are contemplated for use herein include encapsulated pigments; conductive polymers; conductive fibers (fibrols or fibrils); conductive additives; as well as mixtures thereof. These additional conductive materials may be used conjointly with the conductive pigments identified above. Where used, the conductivity enhancers will be present in an amount dependent on the desired conductivity level of the composition.

The total amount of conductive material, i.e., pigment with or without enhancer, is, generally, employed in an amount depending on the nature and characteristics of the pigment itself, i.e., the conductivity of the pigment, the particle size of the pigment, etc. The amount of conductive pigment generally varies depending upon the final desired conductivity level of the composition. In one useful embodiment, conductive carbon is used as the conductive pigment. In this embodiment, the conductive carbon black is employed in an amount ranging from about 2% to about 15%, by weight, based upon the total resin solids. In another useful embodiment, the conductive carbon black is present in an amount from about 4% to about 10% by weight based on the total resin solids. In yet another useful embodiment, the conductive carbon black is present in an amount of about 6.76% by weight based on the total resin solids.

One advantage of using the resin system as described herein is that it allows for various particle sizes of conductive material to be used without compromising the level of conductivity that the material provides. Typically, carbon black, for example, diminishes in conductivity or loses its conductivity if it is subject to overgrinding. However, with the use of the unsaturated polyester of the subject invention, conductivity is retained even when the particle size of the carbon back is very small due to grinding or overgrinding.

The composition may, also, contain fillers or extenders that may be organic or inorganic, as well as mixtures thereof. Suitable fillers or extenders which may be added to the composition for various properties include the commonly used fillers or extenders, such as carbonates, silicates, sulfates, silicas, sulfites, clays, carbides, oxides, polyfluorinated ethylenes, ferrites, aluminas, nitrides, polymeric fillers, fibers, cellulosics, ceramics, and the associated precipitates, derivatives, and hydrates and the like, as well as mixtures thereof. These extenders may be in a treated or non-treated form, and may be natural occurring products or synthetically manufactured, and may be reclaimed or recycled, as well as combinations thereof.

In one embodiment, the nonconductive pigment may be present in a ratio of about 0.5:2.0 pigment to binder ratio. One example of a nonconductive pigment that can be used in accordance with this invention is barium sulfate.

The composition may also contain various pigments to introduce color to the composition. Common pigments used may include, titanium dioxide, phthalos, iron oxides, lamp black, carbon black, various organic and inorganic pigments, and mixtures thereof.

As noted hereinabove minor amounts of dispersing aids (such as, for example, polymeric dispersants). Any type of conventional dispersant may be used in accordance with this invention, such as anionic, cationic, amphoteric, or nonionic dispersants. Such dispersing agents include polymeric dispersants. In addition, particle dispersants may also be used.

Particle dispersants are particles that are very similar to the pigment to be dispersed promoting absorption on to that pigment particle. These particle dispersants, such the Solsperse technology sold by Avecia, are modified and contain anchoring sites to accept pigment dispersants.

In one embodiment, the coating composition may include from about 0.5% to about 30%, by weight, dispersant based on the total pigment weight in the composition. In another useful embodiment the dispersant is present in an amount from about 5% to about 20%, by weight, based upon the total pigment weight of the composition. In yet another useful embodiment, dispersant is present in an amount of about 8.8% by weight, based on the total pigment of the composition.

Flow additives, defoamers, deaerators, suspension aids, scavengers, stabilizers, antioxidants, plasticizers, nonfunctional or nonreactive diluents, hydrocarbon oils, conductive additives, and the like, as well as mixtures thereof may be incorporated into the composition to tailor the properties of the primer/sealer. These and other additives generally comprise from about 0 to 2.5% by weight based on the total resin solids.

In one embodiment, a solvent, or mixture of solvents, may be used in accordance with this invention. Although most conventional solvents that are used in the coatings industry may be used in accordance with this invention, in one embodiment, examples of useful solvents include oxygenated and hydrocarbon solvents. Oxygenated solvents typically consist of ketones and esters, and include but are not limited to acetone, methyl ethyl ketone, methyl propyl ketone, methyl isobutyl ketone, methyl n-amyl ketone, C-11 ketone, cyclohexanone, diisobutyl ketone, and methyl isoamyl ketone, as well as methyl acetate, ethyl acetate, n-propyl acetate, isopropyl acetate, n-butyl acetate, isobutyl acetate, 2-ethylhexyl acetate, n-butyl propionate, n-pentyl propionate, ethyl 3-ethoxypropoinate, propylene glycol methyl ether acetate, dipropylene glycol methyl ether acetate, ethylene glycol butyl ether acetate, and diethylene glycol butyl ether acetate. Hydrocarbon solvents that may be used in accordance with this invention include but are not limited to aromatic and halogenated solvents, such as for example toluene, xylene, aromatic 100, aromatic 150, aromatic 200, and parachlorobenzotrifluoride.

The primer (or coating composition) is cured generally through the application of low temperature radiation. In one embodiment, the primer is cured in a low bake oven. In one embodiment, the composition, once applied to a part, can be cured in an oven having an oven temperature of about 180° F. for at least about 30 minutes, however, other cure schedules may be employed. For example, the oven temperature may be set anywhere from about 140° F. to about 300° F. Moreover, the cure time, may range from about 10 minutes to about 60 minutes, as dependent on the oven temperature. Conventional ovens can be employed to cure the composition once it is applied onto a surface. The primer alternatively has the capacity to be cured with IR radiation or other devices. Upon curing, the material polymerizes in and about the substrate, providing adhesion thereto.

In one useful embodiment, the polymer of the present invention may be cured by thermal exposure, such as by exposure in a conventional oven or through an IR cure, or combinations thereof.

Possible methods of application of the coating composition include the use of air atomizing spray equipment including conventional air spray (using 20-80 psi air pressure to atomize the liquid paint) providing a low level of transfer efficiency, and high volume low pressure (HVLP) (uses less than 10 psi air pressure and 12-16 cubic feet of air per minute to atomize the liquid paint) providing a higher level of transfer efficiency than conventional methods of application.

Additional application methods consist of electrostatic application using air atomizing spray equipment and high-speed rotary application equipment such as a bell or disc. Electrostatic application provides a higher level of transfer efficiency as compared to other non-electrostatic application.

As noted hereinabove the present coating composition is useful both as an electrically conductive primer and sealer. After being deposited onto a surface, other electrically conductive or non-electroconductive coatings may be applied via electrostatic or other application method or methods thereunto because of the electrically conductive nature of the cured coating.

The primer as disclosed herein contains good adhesion characteristics to thermoplastic and thermoset plastic substrates including but not limited to ABS (acrylonitrile butadiene styrene), PC-ABS (polycarbonate-acrylonitrile butadiene styrene), DCPD (polydicyclopentadiene), and UP (unsaturated polyester, including SMC (sheet molding compound) and BMC (bulk molding compound)), reaction injection molding (RIM), reaction thermal molding (RTM), polycarbonate (PC), PPO (polyphenylene oxide), PC Polyester (polycarbonate polyester), hybrid molding, and mixtures thereof, as well as other conventional thermoplastic and thermoset materials.

For a more complete understanding of the present invention reference is made to the following illustrative examples.

Preparation of Polyester

EXAMPLE 1

A 5-liter reactor was equipped with stirrer, thermocouple, nitrogene inlet tube, pack column, condenser and receiver. The reactor was charged with 150.0 g of trimethylolpropane, 1380.0 g of propylene glycol, 360.0 g of adipic acid, 750.0 g of maleic anhydride, 360.0 g of phthalic anhydride and 3.0 g of dibutyltin oxide. The mixture was gradually heated to 210° C. under agitation and nitrogene blanket and was hold at 210° C. until the acid value reached 5~10 mg KOH/g. The vapor temperature at the top of the pack column was maintained below 100° C. during the process. The mixture was then cooled and filtered through a 25-micron filter bag and discharged.

EXAMPLE 2

A 5-liter reactor was equipped with stirrer, thermocouple, nitrogene inlet tube, pack column, condenser and receiver. The reactor was charged with 144.4 g of trimethylolpropane, 1325.4 g of propylene glycol, 809.6 g of 1,4-cyclohexanedicarboxylic acid, 720.6 g of maleic anhydride, and 2.1 g of butyl stanoic acid. The mixture was gradually heated to 210° C. under agitation and nitrogene blanket and was hold at 210° C. until the acid value reached 5~10 mg KOH/g. The vapor temperature at the top of the pack column was maintained below 100° C. during the process. The mixture was then cooled and filtered through a 25-micron filter bag and discharged.

EXAMPLE 3

A 5-liter reactor was equipped with stirrer, thermocouple, nitrogene inlet tube, pack column, condenser and receiver. The reactor was charged with 124.2 g of trimethylolpropane, 1139.8 g of propylene glycol, 1736.1 g of 1,4-cyclohexanedicarboxylic acid, and 1.8 g of butyl stanoic acid. The mixture was gradually heated to 210° C. under agitation and nitrogene blanket and was hold at 210° C. until the acid value reached 5~10 mg KOH/g. The vapor temperature at the top of the pack column was maintained below 100° C. during the process. The mixture was then cooled to 145° C. before adding 450.0 g of 2-heptanone. The solution was filtered through a 25-micron filter bag and discharged.

Preparation of Acrylic

EXAMPLE 4

To a 5-liter reactor, which was equipped with stirrer, thermocouple, condenser, and nitrogene and monomer inlet tubes, 712.2 g of aromatic naphtha 100 flash was added. The solvent was heat to 150° C. under agitation and nitrogene blanket. A mixture of 367.1 g of methylmethacrylate, 553.3 g of butyl acrylate, 525.4 g of 2-hydroxylethyl methacrylate, 385.7 g of styrene was fed into the reactor over five hours. Simultaneously, a mixture of 84.9 g of aromatic naphtha 100 flash and 118.7 g of tert-amylethylhexyl peroxycarbonate was also fed over five hours at 150° C. The solution was held for 30 minutes before adding 3.6 g of tert-amylethylhexyl peroxycarbonate. The solution was then held for another two and half hours, reduced with 154.2 g of butyl acetate and 81.5 g of aromatic naphtha 100 flash, cooled and discharged through a 25-micron filter.

EXAMPLE 5

To a 5-liter reactor, which was equipped with stirrer, thermocouple, condenser, and nitrogene and monomer inlet tubes, 807.5 g of 2-heptanone was added. The solvent was heat to 135° C. under agitation and nitrogene blanket. A mixture of 847.9 g of methylmethacrylate, 403.8 g of styrene, 383.6 g of butyl acrylate, 383.6 g of 2-hydroxylethyl methacrylate was fed into the reactor over three hours. Simultaneously, 161.5 g of tert-butyl peroctoate was also fed over three hours at 135° C. The solution was held for 30 minutes after the feeding. Then, 6.1 g of tert-butyl peroctoate was added and held for 30 minutes before adding another 6.1 g of tert-butyl peroctoate. The solution was held for two hours before cooling, filtrating and discharge.

EXAMPLE 6

To a 5-liter reactor, which was equipped with stirrer, thermocouple, condenser, and nitrogene and monomer inlet tubes, 991.6 g of toluene was added. The solvent was heat to 109° C. under agitation and nitrogene blanket. A mixture of 284.3 g of butyl acrylate, 313.7 g of methylmethacrylate, 404.1 g of 2-hydroxylethyl methacrylate, 472.7 g of isobornyl methacrylate was fed into the reactor over three hours. Simultaneously, a solution containing 39.6 g of azobisisobutyronitrile and 158.2 g of toluene was also fed over three hours at 109° C. The solution was held for 30 minutes before adding the solution of 3.7 g of azobisisobutyronitrile and 84.0 g of toluene. The solution was then held for another three hours, then, reduced with 247.9 g of toluene, cooled and discharged through a 25-micron filter.

Preparation of Primer

EXAMPLE 7

80 grams of cyclohexanone, 55.3 grams of isobutyl acetate, 196.3 grams of the polyester described in Example 1, 100.6 grams of the acrylic described in Example 4, and 44 grams of Disperbyk 182 (Byk Chemie) were added to a lab shaker mill container. The contents were mixed with a cowles blade. 310 grams of Ti-Pure R-960 TiO2 (Du Pont Company), 76 grams of calcium carbonate, and 9 grams of Ketjen Black EC600 JD (Akzo Nobel) were slowly added under medium agitation. The batch was mixed at high speed for 30 minutes. 200 ml of 2 mm steel shot were added to the batch and shaken on a Red Devil paint shaker for 90 minutes to achieve a 7 H grind. 40.3 grams of isopropyl acetate and 80.8 grams of acetone were added to the batch. The media was filtered out of the paint.

The primer was catalyzed with 41.1 grams of Tolonate HDT-LV (Rhodia Inc.) and 95.8 grams of Mondur MRS-5 (Bayer Corporation), and reduced with 65.9 grams of acetone.

Primer and topcoat were applied as described in the application procedures (see below) to Meridian SLI-269 SMC. This primer formulation contained a 6B room temperature and 7A frozen gravelometer rating, 0% dry adhesion loss, 32% primer to substrate adhesion loss in 96 hr. humidity, 10% primer to substrate adhesion loss in 240 hr water immersion, and 13% primer to substrate adhesion loss in 240 hr Cleveland condenser. Conductivity was 153.

EXAMPLE 8

131.3 grams of the polyester described in Example 2, 175.9 grams of the acrylic described in Example 5, 22.9 grams of n-butyl acetate, 38.9 grams of Disperbyk 103 (Byk Chemie), and 82.5 grams of n-butyl propionate were added to a lab shaker mill container. The contents were mixed with a cowles blade. 24.9 grams of Vulcan XC72R (Cabot Corporation), 418.3 grams of barium sulfate, and 11.7 grams n-butyl acetate were slowly added under medium agitation. The batch was mixed at high speed for 30 minutes. 200 ml of 2 mm ceramic media were added to the batch and shaken on a Red Devil paint shaker for 90 minutes to achieve a 6.5 H grind. 24.37 grams of methyl n-amyl ketone (MAK), 46 grams of n-butyl acetate, 0.78 grams of Byk 322, 11.19 grams of a 2% dibutyl tin diluarte/n-butyl acetate solution (Air Products and Chemicals Inc.), and 0.6 grams of Polycat 8 (Air Products and Chemicals Inc.) were added to the batch. The media was filtered out of the paint.

The primer was catalyzed with 128.1 grams of Tolonate HDT-LV (Rhodia Inc.) and reduced with 45 grams of methyl n-amyl ketone and 131 grams of acetone.

The primer was applied as described in the application procedure to Meridian SLI-269 SMC. Conductivity was 155.

EXAMPLE 9

131.3 grams of the polyester described in Example 3, 175.9 grams of the acrylic described in Example 5, 22.9 grams of n-butyl acetate, 38.9 grams of Disperbyk 103 (Byk Chemie), and 82.5 grams of n-butyl propionate were added to a lab shaker mill container. The contents were mixed with a cowles blade. 24.9 grams of Vulcan XC72R (Cabot Corporation), 418.3 grams of barium sulfate, and 11.7 grams n-butyl acetate were slowly added under medium agitation. The batch was mixed at high speed for 30 minutes. 200 ml of 2 mm ceramic media were added to the batch and shaken on a Red Devil paint shaker for 90 minutes to achieve a 6.5 H grind. 24.37 grams of methyl n-amyl ketone, 46 grams of n-butyl acetate, 0.78 grams of Byk 322, 11.19 grams of a 2% dibutyl tin diluarte/n-butyl acetate solution (Air Products and Chemicals Inc.), and 0.6 grams of Polycat 8 (Air Products and Chemicals Inc.) were added to the batch. The media was filtered out of the paint.

The primer was catalyzed with 128.1 grams of Tolonate HDT-LV (Rhodia Inc.) and reduced with 45 grams of methyl n-amyl ketone and 131 grams of acetone.

The primer was applied as described in the application procedure to Meridian SLI-269 SMC. Conductivity was 143.

EXAMPLE 10

80 grams of cyclohexanone, 25.5 grams of isobutyl acetate, 195 grams of the polyester described in Example 1, 130 grams of the acrylic described in Example 6, and 44 grams of Disperbyk 182 (Byk Chemie) were added to a lab shaker mill container. The contents were mixed with a cowles blade. 310 grams of Ti-Pure R-960 TiO2 (Du Pont Company), 76 grams of calcium carbonate, and 9 grams of Ketjen Black EC600 JD (Akzo Nobel) were slowly added under medium agitation. The batch was mixed at high speed for 30 minutes. 200 ml of 2 mm steel shot were added to the batch and shaken on a Red Devil paint shaker for 90 minutes to achieve a 7 H grind. 40.3 grams of isopropyl acetate and 80.8 grams of acetone were added to the batch. The media was filtered out of the paint.

The primer was catalyzed with 41.9 grams of Tolonate HDT-LV (Rhodia Inc.) and 97.9 grams of Mondur MRS-5 (Bayer Corporation), and reduced with 65.9 grams of acetone.

Primer and topcoat were applied as described in the application procedures to Meridian SLI-269 SMC. This primer formulation contained a 6B room temperature and 6B frozen gravelometer rating, 0% dry adhesion loss, 63% primer to substrate adhesion loss in 96 hr. humidity, 23% primer to substrate adhesion loss in 240 hr water immersion, and 43% primer to substrate adhesion loss in 240 hr Cleveland condenser. Conductivity was 150.

Primer Application Procedure

Primer components were mixed and reduced as described in the each individual example. The primer was applied to already clean Meridian SLI-269 SMC (sheet molded compound) panels (Meridian Automotive Systems). The primer was applied with conventional air spray application equipment to a dry film thickness of 1-1.5 mils. The primer received a 5-10 minute flash followed by a 30 minute 180° F. bake.

Topcoat Application Procedure

The topcoat system consists of an OEM 1 K wet on wet high bake basecoat/clearcoat. The basecoat and clear coat was applied with conventional air spray application equipment. The basecoat was applied to a dry film thickness of 0.8-1.2 mils, and the clear coat was applied to a dry film thickness of 1.2-1.5 mils. The clear coat was applied wet on wet over the basecoat. The basecoat receives a 10 minute flash before clear coat is applied, and the basecoat/clear coat system received a 10-15 minute flash followed by a 30 minute 280° F. bake.

Paint Evaluation Procedure

Testing of the painted substrate began no sooner than 3 days after the primed substrate had been topcoated. Testing consisted of specific test methods and test equipment described in ASTM and SAE Test Methods. All adhesion tests were performed in triplicate and average test results were reported.

ASTM References
ASTM D3359 Adhesion
ASTM D2247 Humidity
ASTM D870 Water Immersion
ASTM D4585 Cleveland Condenser SAE References
SAE J400 Gravelometer While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A coating composition, comprising:
    (a) resin system, wherein said resin system includes at least one hydroxy functional unsaturated polyester and at least one hydroxy functional acrylic polymer;
    (b) a crosslinker selected from the group consisting of amino resins and isocyanates; and
    (c) a conductive pigment;
    wherein said unsaturated polyester is unsaturated in the backbone of the polyester and does not undergo further crosslinking in the coating composition through its unsaturation.

2. The composition of claim 1, wherein said polyester contains secondary hydroxyl functionality.

3. The composition of claim 1, wherein said polyester is the esterification reaction product of trimethylolpropane, propylene glycol, maleic anhydride, adipic acid, and phthalic anhydride.

4. The composition of claim 1, wherein said polyester has a weight average molecular weight from about 700 to about 1300.

5. The composition of claim 1, wherein said polyester has an OH value from about 50 to about 400 mg KOH/g.

6. The composition of claim 1, wherein said polyester has an OH value from about 100 to about 300 mg KOH/g.

7. The composition of claim 1, wherein said acrylic has an OH value from about 20 to about 200 mg KOH/g.

8. The composition of claim 1, wherein said acrylic has an OH value from about 50 to about 100 mg KOH/g.

9. The composition of claim 1, wherein said acrylic has a weight average molecular weight from about 1600 to about 7000.

10. The composition of claim 1, wherein the unsaturated polyester comprises from about 10% to about 90% by weight of the resin system.

11. The composition of claim 1, wherein said crosslinker is an isocyanate.

12. The composition of claim 11, wherein said isocyanate is an aliphatic isocyanate.

13. The composition of claim 11, wherein the crosslinker is present in a ratio of about 0.8 to about 1.2 based on the NCO:OH ratio.

14. The composition of claim 1, wherein the conductive pigment is carbon black.

15. The composition of claim 1, wherein said crosslinker is an amino resin.

16. The composition of claim 1, wherein the unsaturated polyester is prepared by the esterification of at least on ethylenically unsaturated di- or higher polycarboxylic acid or anhydride with saturated or unsaturated di- or higher polyols.

17. The composition of claim 16, wherein said polyester is the esterification reaction product obtained by reacting about 5% to about 60% by weight, based upon the total weight of acids, anhydrides and polyols, of unsaturated dibasic acids or anhydrides with a polyol.

18. The composition of claim 16, wherein said polyester is the esterification reaction product obtained by reacting about 10% to about 40% by weight, based upon the total weight of acids, anhydrides and polyols, of unsaturated dibasic acids or anhydrides with a polyol.

19. The composition of claim 18, wherein the unsaturated acid or anhydride comprises maleic anhydride.

* * * * *